US010693659B2

(12) United States Patent
Bergmann (10) Patent No.: US 10,693,659 B2
(45) Date of Patent: Jun. 23, 2020

(54) GENERATING PSEUDO RANDOM NUMBERS FOR QUANTUM COMPUTING SECURE AUTHENTICATION

(71) Applicant: International Business Machines Corporation, Armonk, NY (US)

(72) Inventor: Tobias U. Bergmann, Weinstadt (DE)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 15/411,818

(22) Filed: Jan. 20, 2017

(65) Prior Publication Data

US 2018/0212779 A1 Jul. 26, 2018

(51) Int. Cl.
| | |
|---|---|
| *H04L 9/32* | (2006.01) |
| *H04L 9/06* | (2006.01) |
| *H04L 9/08* | (2006.01) |
| *H04L 9/14* | (2006.01) |

(52) U.S. Cl.
CPC .......... *H04L 9/3247* (2013.01); *H04L 9/0643* (2013.01); *H04L 9/0662* (2013.01); *H04L 9/0869* (2013.01); *H04L 9/14* (2013.01); *H04L 9/3239* (2013.01); *H04L 2209/38* (2013.01)

(58) Field of Classification Search
CPC ... H04L 9/3236; H04L 9/3247; H04L 9/0643; H04L 9/0662; H04L 9/0869; H04L 2209/38; G06F 7/58
See application file for complete search history.

(56) References Cited

U.S. PATENT DOCUMENTS

| | | | |
|---|---|---|---|
| 9,172,698 B1 * | 10/2015 | Evans | .................. H04L 63/0853 |
| 2002/0172359 A1 * | 11/2002 | Saarinen | .................. G06F 7/588 |
| | | | 380/46 |
| 2013/0227286 A1 | 8/2013 | Brisson | |

FOREIGN PATENT DOCUMENTS

| | | |
|---|---|---|
| CN | 104270247 A | 1/2015 |
| WO | 2014035696 A2 | 3/2014 |

OTHER PUBLICATIONS

Campagna et al., "Quantum Safe Cryptography and Security," ETSI White Paper No. 8, Jun. 2015, pp. 1-64.
Jost et al., "Cryptography in an All Encrypted World," Ericsson Technology Review, vol. 92, #10, Dec. 2015, pp. 1-14.
(Continued)

*Primary Examiner* — Paul E Callahan
(74) *Attorney, Agent, or Firm* — Zilka-Kotab, P.C.

(57) ABSTRACT

A generator device being configured for generating pseudo random numbers, the generator device comprising a computing device operable for (i) calculating a first hash chain from an initial hash value (H_0), the first hash chain comprising a first sequence of M hash values (HA_1, HA_2, ..., HA_M); (ii) calculating a second hash chain (20) comprising a second sequence of M hash values (HB_1, HB_2, ..., HB_M) from the initial hash value (H_0) and the hash values (HA_1, HA_2, ..., HA_M) of the first sequence; and (iii) determining the pseudo random numbers from the hash values (HB_1, HB_2, ..., HB_M) of the second sequence. Also disclosed are a method for generating pseudo random numbers and a method for quantum computing secure authentication, as well as a computer program product and a data processing system.

24 Claims, 4 Drawing Sheets

(56) References Cited

OTHER PUBLICATIONS

Information Technology Labaratory, "SHA-3 Standard: Permutation-Based Hash and Extendable-Output Functions," Aug. 2015, pp. 1-37, Retrieved From http://dx.doi.org/10.6028/NIST.FIPS.202.
Barker et al., "Recommendation for Random Number Generation Using Deterministic Random Bit Generators," NIST Special Publication 800-90A, Jan. 2012, pp. 1-137, Retrieved From http://nvlpubs.nist.gov/nistpubs/SpecialPublications/NIST.SP.800-90Ar1.pdf.

* cited by examiner

| P=Hash width [bit]<br>Q= No. messages | Minimize public key size | Minimize signature size |
|---|---|---|
| Private key | P | P |
| Public key | P | (3Q-1) × P |
| Signature | (3+log Q) × P | 2 × P |

GENERATING PSEUDO RANDOM NUMBERS FOR QUANTUM COMPUTING SECURE AUTHENTICATION

The present invention relates in general to data processing systems, and in particular, to a generator device and methods as well as computer program products and systems for generating pseudo random numbers and for quantum computing secure authentication.

BACKGROUND

Classical asymmetric cryptographic algorithms used in the field of security for electronic communications and in particular network scaling, authentication and identity management, detection, revocation and encryption methods, intrusion detection, signature, non-repudiation, authorization, digital rights management, provenance and key related network security functions may be broken with quantum computers, as there may exist several processes being executed at the same time.

Existing authentication methods, such as the so-called RSA cryptosystem introduced by Rivest, Shamir and Adleman in 1977, ECC (Elliptic Curve Cryptography), or the like, are either not resistant against quantum computer attacks, or require large key sizes, such as, e.g., with methods like the McEliece method introduced by McEliece in 1978, or Rainbow table method, which employs a precomputed table for reversing cryptographic hash functions.

There exist a few alternative post-quantum cryptography methods, but they all require a large number of key bits. The best known methods, like SIDH (supersingular isogeny Diffie-Hellman key exchange) and NTRU (an open source public-key cryptosystem using lattice based cryptography to encrypt and decrypt data), require around 6000 key bits for 128 bits of security.

Variants of the known Shor's Algorithm for factorization and discrete logarithms allow quantum computers to break existing authentication methods. Post quantum cryptography methods exist that are not broken by variants of Shor's Algorithm, but they require large key and/or signature lengths and high computational effort.

Cryptographic algorithms and authentication schemes usually are based on generated pseudo random numbers. According to prior art, e.g., a one directional chain of hash values may be used as pseudo random number generator comprising a counter as an offset for choosing random number selection. Thus the counter is part of the key and increases key size.

Hash functions are components for many important information security applications, including the generation and verification of digital signatures, key derivation, and pseudo random bit generation.

A hash function is a function on binary data (i.e., bit strings) for which the length of the output is fixed. The input to a hash function is called the message, and the output is called the (message) digest or hash value. The digest often serves as a condensed representation of the message. The so-called SHA-3 family of hash functions according to state of the art consists of four cryptographic hash functions, called SHA3-224, SHA3-256, SHA3-384, and SHA3-512; in each case, the suffix after the dash indicates the fixed length of the digest, e.g., SHA3-256 produces 256-bit digests.

SUMMARY

A generator device is proposed, being configured for generating pseudo random numbers, the generator device comprising a computing device operable for (i) calculating a first hash chain from an initial hash value, the first hash chain comprising a first sequence of M hash values, with index M being a positive integer; (ii) calculating a second hash chain comprising a second sequence of M hash values from the initial hash value and the hash values of the first sequence; and (iii) determining the pseudo random numbers from the hash values of the second sequence.

Further a method is proposed for generating pseudo random numbers, comprising (i) calculating a first hash chain from an initial hash value, the first hash chain comprising a first sequence of M hash values, with index M being a positive integer; (ii) calculating a second hash chain comprising a second sequence of M hash values from the initial hash value and the hash values of the first sequence; and (iii) determining the pseudo random numbers from the hash values of the second sequence.

A further method is proposed for quantum computing secure authentication, comprising (i) generating pseudo random numbers with a random number generator device; (ii) using a secure cryptographic hash function; (iii) using a secure signature scheme for creating signatures; and (iv) creating a binary tree to prove an authenticity of a signee.

Further a favorable computer program product is proposed for generating pseudo random numbers, the computer program product comprising a computer readable storage medium having program instructions embodied therewith, the program instructions executable by a computer to cause the computer to perform a method comprising, (i) calculating a first hash chain from an initial hash value, the first hash chain comprising a first sequence of M hash values, with index M being a positive integer; (ii) calculating a second hash chain comprising a second sequence of M hash values from the initial hash value and the hash values of the first sequence; and (iii) determining the pseudo random numbers from the hash values of the second sequence.

Further, a data processing system for execution of a data processing program is proposed, comprising computer readable program instructions for performing the method described above.

Further a favorable computer program product is proposed for quantum computing secure authentication, the computer program product comprising a computer readable storage medium having program instructions embodied therewith, the program instructions executable by a computer to cause the computer to perform a method comprising, (i) generating pseudo random numbers with a random number generator device; (ii) using a secure cryptographic hash function; (iii) using a secure signature scheme for creating signatures; and (iv) creating a binary tree to prove an authenticity of a signee.

Further, a data processing system for execution of a data processing program is proposed, comprising computer readable program instructions for performing the method described above.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments provide a generator device being configured for generating pseudo random numbers as well as a method for generating pseudo random numbers and a method for quantum computing secure authentication.

The illustrative embodiments are sometimes described herein using particular technologies only as an example for the clarity of the description. The illustrative embodiments may be used for a generator device being configured for generating pseudo random numbers, the generator device comprising a computing device operable for (i) calculating a first hash chain from an initial hash value, the first hash chain comprising a first sequence of M hash values, with index M being a positive integer; (ii) calculating a second hash chain comprising a second sequence of M hash values from the initial hash value and the hash values of the first sequence; and (iii) determining the pseudo random numbers from the hash values of the second sequence. The illustrative embodiments may further be used for a method for quantum computing secure authentication, comprising (i) generating pseudo random numbers with a random number generator device; (ii) using a secure cryptographic hash function; (iii) using a secure signature scheme for creating signatures; and (iv) creating a binary tree to prove an authenticity of a signee.

An advantage of using SHA-3 hash functions for some embodiments of the inventive method is given by the fact that processors often exhibit hardware accelerators for the SHA-3 hash operations as this is an industry standard. Yet, in principle, various embodiments of the inventive generator device and various embodiments of the inventive method do not depend on a specific hash function as long as it is a quantum computer resistant hash function.

Figure 1:
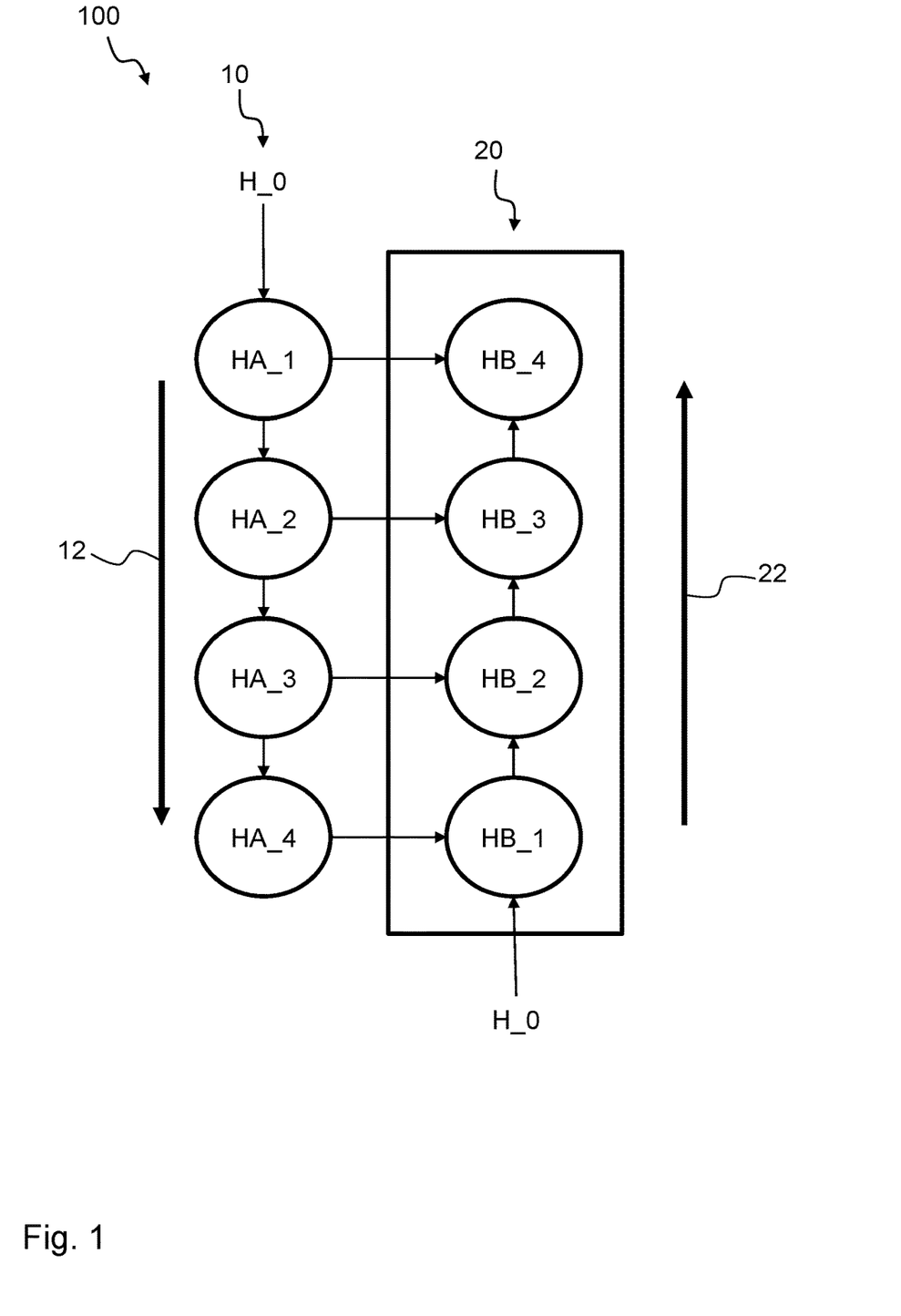
FIG. 1 depicts a scheme for generating pseudo random numbers with a generator device according to an embodiment of the invention.

FIG. 1 depicts a scheme for generating pseudo random numbers with a generator device 100 according to an embodiment of the invention. The generator device 100 implementing a method for generating pseudo random numbers is using a bi-directional hash chain. This algorithm is used to compute a set of pseudo random numbers from a single seed S, which is the starting value for generating the pseudo random numbers.

The generator device 100, which is shown in FIG. 1 only as a scheme illustrating the algorithmic method for generating pseudo random numbers, comprises a computing device operable for calculating a first hash chain 10 from an initial hash value H_0, the first hash chain 10 comprising a first sequence 12 of M hash values HA_1, HA_2, ..., HA_M, with index M being a positive integer. Further a second hash chain 20 is calculated comprising a second sequence 22 of M hash values HB_1, HB_2, ..., HB_M from the initial hash value H_0 and the hash values HA_1, HA_2, ..., HA_M of the first sequence 12. The pseudo random numbers may be determined from the hash values HB_1, HB_2, ..., HB_M of the second sequence 22. The first and second sequence are marked in FIG. 1 by arrows 12, 22.

Advantageously a cryptographic hash function may be applied starting from the initial hash value H_0 for calculating the hash values HA_1, HA_2, ..., HA_M of the first sequence 12.

The initial hash value H_0 may advantageously be calculated from a seed S by applying a cryptographic hash function.

For determining the second hash chain 20 a first hash value HB_1 of the second sequence 22 may be calculated from the initial hash value H_0 and a last hash value HA_M of the first sequence 12. Then a subsequent hash value HB_n+1 of the second sequence 22 may be calculated from a preceding hash value HB_n of the second sequence 22 and a value HA_1−1 of the first sequence 12 preceding the hash value HA_1 of the first sequence 12 that has been used to calculate the preceding hash value HB_n of the second sequence 22, with index n, 1 being a positive integer from 1 to M.

Advantageously for calculating a hash value of the second chain 20 HB_n, it is indispensable to calculate all values of the first chain 10, as there does not exist any short cut. The hash chains 10, 20 in any case have to be calculated back and forth in order to get a desired hash value.

The subsequent hash value HB_n+1 of the second sequence 22 may be advantageously calculated based on determining a binary concatenation or based on an XOR operation.

The subsequent hash value HB_n+1 of the second sequence 22 may be calculated from the preceding hash value HB_n of the second sequence 22 and a hash value HA_M−n of the first sequence 12, where M equals an index of the last hash value HA_M of the first sequence 12.

Advantageously the proposed algorithm generates the pseudo random numbers in a way that even if all but one of the computed pseudo random numbers are known and a general quantum computer is used, it is still as hard to find the seed S as it is to find the remaining pseudo random number.

If the underlying hash function is bijective it is less likely that a so-called Grover variant can find the inverse using significantly less than $2^{P/2}$ steps, where P is the so-called hash width, i.e. the bit-length of the hash value.

This way computing a secret key from other keys is as hard as computing the seed S itself. Both tasks suggest approximately P/2 bits of security against quantum computers.

According to one embodiment of a method for generating pseudo random numbers, a private property is a seed S of width P bits. This is the master secret key used to derive the pseudo random numbers from this seed S, which are used as secret keys later on.

H( ) is a secure hash function (e.g. SHA-3). It is bijective when used to hash a p bit input to a p bit output. A hash value of, e.g., HA_k in FIG. 1 means applying the hash function H( ) k times, where k is a positive integer. HA_k equals to applying the hash function H( ) to HA_k−1: H(HA_k−1).

An initial hash value of H_0=H(S) may first be computed with the seed S, where H_0 is not a secret key.

A sequence of M secret keys may be computed for 1 less or equal to k and k less or equal to M as follows, where M is a positive integer:
HB_k+1=H (HB_k∥HA_M−k(S)), where ∥ is a binary concatenation. The hash function is then a mapping of 2P bits to P bits, where P is a positive integer.

An alternative embodiment may be to use a binary XOR function instead of the concatenation. The hash function is then a mapping of P bits to P bits.

Figure 2:
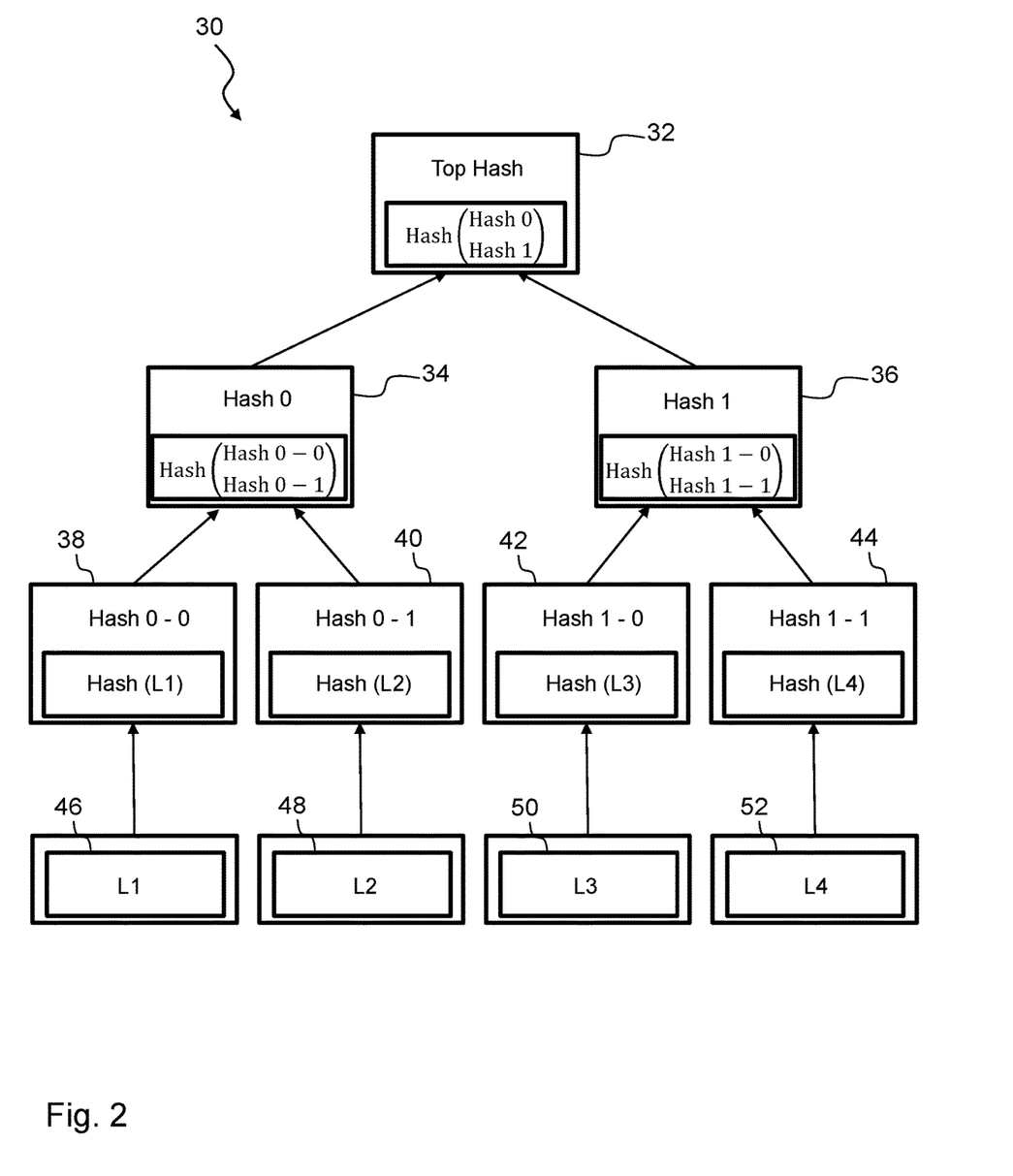
FIG. 2 depicts a binary hash tree, a so-called Merkle tree using Lamport signatures, where hash values are generated according to an embodiment of the invention.

FIG. 2 depicts a binary hash tree 30, a so-called Merkle tree using Lamport signatures 46, 48, 50, 52, where hash values 34, 36, 38, 40, 42, 44 are generated according to an embodiment of the invention.

The innovative method for quantum computing secure authentication, comprises (i) generating pseudo random numbers with a random number generator device 100 described in FIG. 1; (ii) using a secure cryptographic hash function; (iii) using a secure signature scheme for creating signatures; and (iv) creating a binary tree to prove an authenticity of a signee.

The proposed method for quantum computing secure authentication makes use of both, existing secure hash functions as well as a so-called Merkle tree based on so-called Lamport signatures.

A binary hash tree or Merkle tree is a tree in which every non-leaf node is labelled with the hash of the labels or values (in case of leaves) of its child nodes. Hash trees allow efficient and secure verification of the contents of large data structures. Hash trees are a generalization of hash lists and hash chains. Demonstrating that a leaf node is a part of the given hash tree requires processing an amount of data proportional to the logarithm of the number of nodes of the tree, in contrast to hash lists, where the amount is proportional to the number of nodes.

A Lamport signature or Lamport one-time signature scheme is a method for constructing a digital signature. Lamport signatures can be built from any cryptographically secure one-way function. Usually a cryptographic hash function is used. Although the potential development of quantum computers threatens the security of many common forms of cryptography such as RSA, it is believed that Lamport signatures with large hash functions would still be secure in that event. Each Lamport signature may only be used to sign a single message. However, combined with binary hash trees, a single signature may be used for many messages, making this a fairly efficient digital signature scheme.

Thus, various embodiments of the method may combine well known algorithms like the so-called permutation-based SHA-3 hash functions and the Merkle trees/Lamport signatures with a quantum computing safe pseudo random number generator. This allows, e.g., to achieve 128 bits of security with less than 300 key bits and much less computation effort than existing methods. The bit efficiency may be 20 times higher than what existing methods offer.

The secure hash function may advantageously be at least one of: SHA-3, AES-based hash, which are hash functions known in the art. For the SHA-3 hash function even hardware accelerators exist in many common processors. Due to an alternative embodiment the secure hash function may also be based on a symmetric cipher. The secure signature scheme may advantageously be a Lamport signature scheme.

By means of FIG. 2 it is described how to combine existing algorithms and the proposed pseudo random number generator device 100 to integrate it into a quantum computing safe authentication scheme. For quantum secure authentication an existing secure hash function of P bits width may be used which is bijective. For example, an SHA-3 hash function exhibiting these properties may be used advantageously. Due to an alternative embodiment a secure hash function (SHA-S) based on a symmetric cipher, for example a so-called AES-based hash, may also be used.

In FIG. 2, the Merkle tree 30 is constructed as a tree-like structure of nodes 32, 34, 36, 38, 40, 42, 44, each node 32, 34, 36, 38, 40, 42, 44 comprising a hash value. Node 32 is the root node. The lowest level of so-called child nodes 38, 40, 42, 44 is created by calculating hash values from the Lamport signatures 46, 48, 50, 52 as an input of keys to the Merkle tree 30. Hash values as information from these child nodes 38, 40, 42, 44 are forwarded to the upper layer of parent nodes 34, 36, representing at the same time child nodes 34, 36 for the root node 32 with the top hash. The hash value in the parent node 34 is thus calculated with a hash function from the hash values of the underlying child nodes 38, 40, whereas the hash value of the parent node 36 is calculated from the hash values of the underlying child nodes 42, 44. The top hash 32 may be calculated with the hash function from the hash values of the child nodes 34, 36.

For a given number of messages to sign, twice as many pseudo random numbers as the number of messages may advantageously be generated.

In a first embodiment half of those generated pseudo random numbers may be used as secret keys and half as public keys for a Lamport signature scheme. Then as a binary tree 30 a Merkle tree may be created from the secret keys. The root node 32 as a top hash of the tree may be published as the exported/published public key with P bits, where P is a positive integer.

Summarizing, the innovative method may comprise (v) generating a list of pseudo random numbers; (vi) using half of the pseudo random numbers as secret keys and the other half as public keys for the Lamport signature scheme; (vii) creating a Merkle tree computing the public keys; and (viii) exporting a root node 32 of the Merkle tree as a public key.

Due to an alternative embodiment the intermediate nodes 34, 36, 38, 40, 42, 44 of the Merkle tree 30 as authentication nodes may be published as part of the public key to reduce the signature size.

Thus the innovative method may alternatively comprise (v) generating a list of pseudo random numbers; (vi) using half of the pseudo random numbers as secret keys and the other half as public keys for the Lamport signature scheme; (vii) creating a Merkle tree computing the public keys; and (viii) exporting intermediate nodes 34, 36, 38, 40, 42, 44 of the Merkle tree as part of the public key.

Due to a further alternative embodiment the root node 32 as well as at least one of the intermediate nodes 34, 36, 38, 40, 42, 44 of the Merkle tree 30 as authentication nodes may be published as part of the public key to reduce the signature size.

The Merkle tree 30 is used to prove the authenticity of the signee. All off-path authentication nodes may be used to verify the authenticity.

Due to an alternative embodiment, before the last secret key is used up, a new list of pseudo random numbers may be generated and the described process repeated. The new public key(s) may be published on a public key chain and signed with one of the remaining keys from the last list. The public key chain may be organized similar to a block chain and may only be written to very rarely, so limited transactions per second are not an issue.

Thus, summarizing, the innovative method may comprise (v) generating a first list of pseudo random numbers; (vi) using half of the pseudo random numbers as secret keys and the other half as public keys for the Lamport signature scheme; (vii) creating a Merkle tree computing the public keys; (viii) generating a second list of pseudo random numbers before the last secret key in the first list is used up; (ix) using half of the pseudo random numbers of the second list as secret keys and the other half as public keys for the Lamport signature scheme; (x) creating a Merkle tree computing the public keys from the second list; (xi) exporting the public keys from the second list on a public key chain; and (xii) signing the public key chain with a remaining secret key of the first list.

Figure 3:
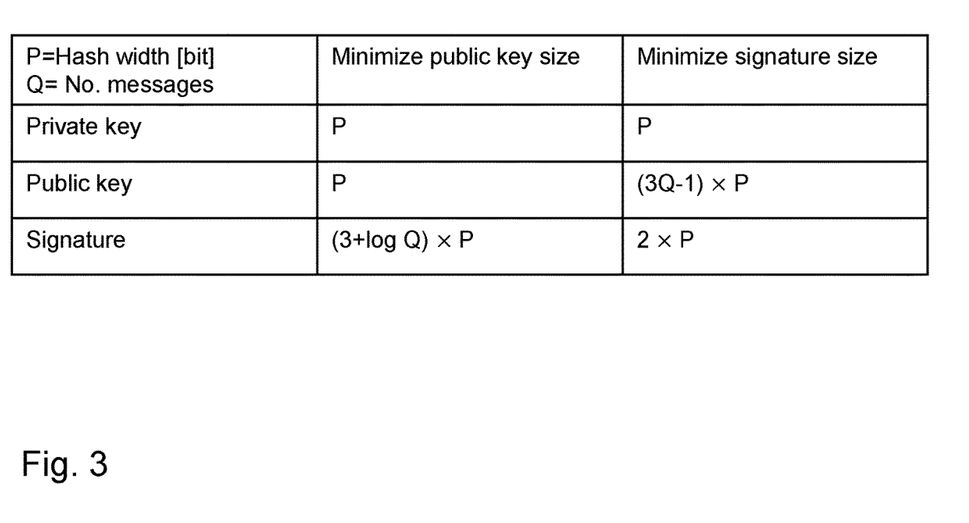
FIG. 3 depicts a table for a trade-off between a public key length and a signature length.

FIG. 3 depicts a table for a trade-off between a public key length and a signature length, comparing the bit lengths needed.

Advantageously an arbitrary trade-off may be found between a public key size and a signature size.

The table in FIG. 3 gives lengths of a public key and a signature for two corner cases, where a minimum public key size is chosen or a minimum signature size is chosen, respectively.

The two corner cases are shown in the following, but advantageously any trade-off in between may be selected as required. Other trade-offs are possible between setup size and signature size. Supposed that P is a hash width in a number of bits, and Q is a number of messages. Supposing the length of the secret key, also called the private key, is P bit corresponding lengths of the public key and the signature may be chosen according to preferences set.

If the public key size shall be minimized, there may be one public key of length P, which may be the top hash $32$ as a root node of the Merkle tree $30$ in FIG. $2$:
minPub_Pub=length (Top Hash)=P.

Then a length of the signature may result in minPub_Sig=length (sig'+Xi+Yi+auth0+ ... +authn−1)=(3+ log Q)×P, where sig' is a Lamport one-time signature of a message. Yi represents the secret part of initial keys, with i numbering the key. According to the embodiment of FIG. $2$, where i lies in the range 1 to 4, Yi may be L1, L2, L3, L4. Xi represents the public part of initial keys. The values auth0 to authn−1 represent the nodes $38, \ldots 36$ of the Merkle tree $30$ with the hash values Hash $0$-$0$, Hash $0$-$1$, . . . Hash $1$ as authentication information, whereas authn represents the Top Hash value $32$. Thus in the embodiment of FIG. $2$ n equals to 6.

If the signature size shall be minimized, the length of the public key may result in min Sig_Pub=length($\Sigma_i$auth$_i$+$\Sigma_i X_i$)=(2Q−1+Q)×P= (3Q−1)×P.

Then the length of the signature may result in min Sig_Sig=length(sig'+Yi)=2×P.

Figure 4:
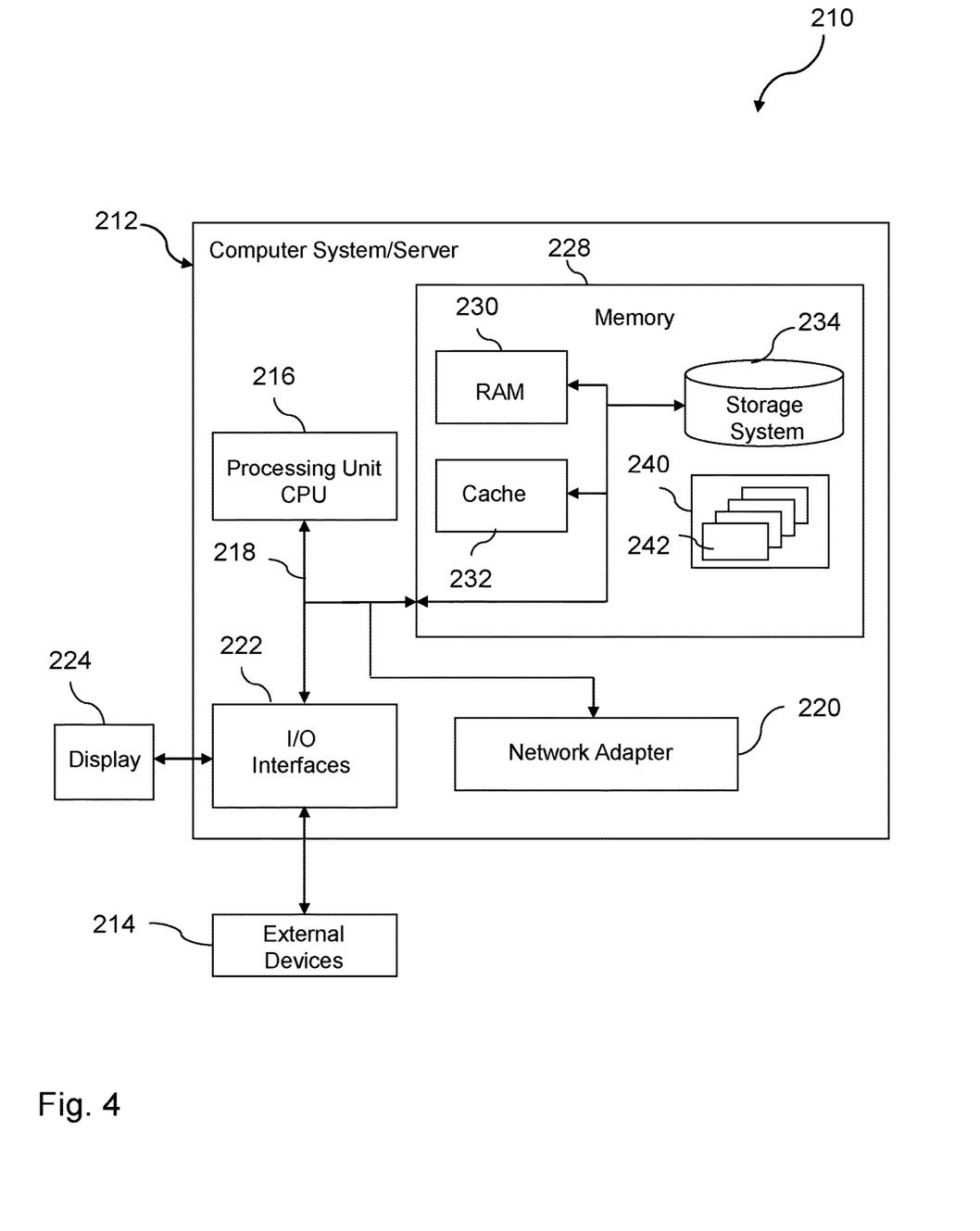
FIG. 4 depicts an example embodiment of a data processing system for executing a method according to an embodiment of the invention.

Referring now to FIG. 4, a schematic of an example of a data processing system $210$ is shown. Data processing system $210$ is only one example of a suitable data processing system and is not intended to suggest any limitation as to the scope of use or functionality of embodiments of the invention described herein. Regardless, data processing system $210$ is capable of being implemented and/or performing any of the functionality set forth herein above.

In data processing system $210$ there is a computer system/server $212$, which is operational with numerous other general purpose or special purpose computing system environments or configurations. Examples of well-known computing systems, environments, and/or configurations that may be suitable for use with computer system/server $212$ include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server $212$ may be described in the general context of computer system executable instructions, such as program modules, being executed by a computer system. Generally, program modules may include routines, programs, objects, components, logic, data structures, and so on that perform particular tasks or implement particular abstract data types. Computer system/server $212$ may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server $212$ in data processing system $210$ is shown in the form of a general-purpose computing device. The components of computer system/server $212$ may include, but are not limited to, one or more processors or processing units $216$, a system memory $228$, and a bus $218$ that couples various system components including system memory $228$ to processor $216$.

Bus $218$ represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server $212$ typically includes a variety of computer system readable media. Such media may be any available media that is accessible by computer system/server $212$, and it includes both volatile and non-volatile media, removable and non-removable media.

System memory $228$ can include computer system readable media in the form of volatile memory, such as random access memory (RAM) $230$ and/or cache memory $232$. Computer system/server $212$ may further include other removable/non-removable, volatile/non-volatile computer system storage media. By way of example only, storage system $234$ can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus $218$ by one or more data media interfaces. As will be further depicted and described below, memory $228$ may include at least one program product having a set (e.g., at least one) of program modules that are configured to carry out the functions of embodiments of the.

Program/utility $240$, having a set (at least one) of program modules $242$, may be stored in memory $228$ by way of example, and not limitation, as well as an Operating System, one or more application programs, other program modules, and program data. Each of the Operating System, one or more application programs, other program modules, and program data or some combination thereof, may include an implementation of a networking environment. Program modules 242 may generally carry out the functions and/or methodologies of various embodiments as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A generator device being configured for generating pseudo random numbers, the generator device comprising a processor and a memory storing instructions for:
   (i) calculating a first hash chain from an initial hash value (H_0), the first hash chain comprising a first sequence of M hash values (HA_1, HA_2, . . . , HA_M), with index M being a positive integer;
   (ii) calculating a second hash chain comprising a second sequence of M hash values (HB_1, HB_2, . . . , HB_M) from the initial hash value (H_0) and the hash values (HA_1, HA_2, . . . , HA_M) of the first sequence, wherein calculating the second hash chain comprises:
      a. calculating a first hash value (HB_1) of the second sequence from the initial hash value (H_0) and a last hash value (HA_M) of the first sequence, and
      b. calculating a subsequent hash value (HB_n+1) of the second sequence from a preceding hash value (HB_n) of the second sequence and a value (HA_1−1) of the first sequence preceding the hash value (HA_1) of the first sequence that has been used to calculate the preceding hash value (HB_n) of the second sequence, with index n, 1 being a positive integer from 1 to M; and
   (iii) determining the pseudo random numbers from the hash values (HB_1, HB_2, . . . , HB_M) of the second sequence; and
   (iv) using a cryptographic algorithm based on the pseudo random numbers for quantum computing secure authentication.

2. The device according to claim 1, being configured for calculating the subsequent hash value (HB_n+1) of the second sequence based on determining a binary concatenation.

3. The device according to claim 1, being configured for calculating the subsequent hash value (HB_n+1) of the second sequence based on an XOR operation.

4. The device according to claim 1, being configured for calculating the subsequent hash value (HB_n+1) of the second sequence from the preceding hash value (HB_n) of the second sequence and a hash value (HA_M−n) of the first sequence, where M equals an index of the last hash value (HA_M) of the first sequence.

5. The device according to claim 1, being configured for subsequently applying a cryptographic hash function starting from the initial hash value (H_0) for calculating the hash values (HA_1, HA_2, . . . , HA_M) of the first sequence.

6. The device according to claim 1, being configured for calculating the initial hash value (H_0) from a seed (S) by applying a cryptographic hash function.

7. A computer-implemented method for generating pseudo random numbers, the method comprising:
   (i) calculating a first hash chain from an initial hash value (H_0), the first hash chain comprising a first sequence of hash values (HA_1, HA_2, . . . , HA_M), with index M being a positive integer;
   (ii) calculating a second hash chain comprising a second sequence of hash values (HB_1, HB_2, . . . , HB_M) from the initial hash value (H_0) and the hash values (HA_1, HA_2, . . . , HA_M) of the first sequence, wherein calculating the second hash chain comprises:
      a. calculating a first hash value (HB_1) of the second sequence from the initial hash value (H_0) and a last hash value (HA_M) of the first sequence, and
      b. calculating a subsequent hash value (HB_n+1) of the second sequence from a preceding hash value (HB_n) of the second sequence and a value (HA_1−1) of the first sequence preceding the hash value (HA_1) of the first sequence that has been used to calculate the preceding hash value (HB_n) of the second sequence, with index n, 1 being a positive integer from 1 to M; and
   (iii) determining the pseudo random numbers from the hash values (HB_1, HB_2, . . . , HB_M) of the second sequence; and
   (iv) using a cryptographic algorithm based on the pseudo random numbers for quantum computing secure authentication.

8. The method according to claim 7, comprising calculating the subsequent hash value (HB_n+1) of the second sequence based on determining a binary concatenation.

9. The method according to claim 7, comprising calculating the subsequent hash value (HB_n+1) of the second sequence based on an XOR operation.

10. The method according to claim 7, comprising calculating the subsequent hash value (HB_n+1) of the second sequence from the preceding hash value (HB_n) of the second sequence and a hash value (HA_M−n) of the first sequence, where M equals an index of the last hash value (HA_M) of the first sequence.

11. The method according to claim 7, comprising subsequently applying a cryptographic hash function starting from the initial hash value (H_0) for calculating the hash values (HA_1, HA_2, . . . , HA_M) of the first sequence.

12. The method according to claim 7, comprising calculating the initial hash value (H_0) from a seed (S) by applying a secure cryptographic hash function.

13. A computer-implemented method for quantum computing secure authentication, comprising:
   (i) generating pseudo random numbers using a generator device configured to generate pseudo random numbers, the generator device comprising a processor and a memory storing instructions for:
      (i) calculating a first hash chain from an initial hash value (H_0), the first hash chain comprising a first sequence of M hash values (HA_1, HA_2, . . . , HA_M), with index M being a positive integer;

(ii) calculating a second hash chain comprising a second sequence of M hash values (HB_1, HB_2, . . . , HB_M) from the initial hash value (H_0) and the hash values (HA_1, HA_2, . . . , HA_M) of the first sequence, wherein calculating the second hash chain comprises:
  i. calculating a first hash value (HB_1) of the second sequence from the initial hash value (H_0) and a last hash value (HA_M) of the first sequence, and
  ii. calculating a subsequent hash value (HB_n+1) of the second sequence from a preceding hash value (HB_n) of the second sequence and a value (HA_1−1) of the first sequence preceding the hash value (HA_1) of the first sequence that has been used to calculate the preceding hash value (HB_n) of the second sequence, with index n, 1 being a positive integer from 1 to M; and
(iii) determining the pseudo random numbers from the hash values (HB_1, HB_2, . . . , HB_M) of the second sequence; and
(iv) using a cryptographic algorithm based on the pseudo random numbers for quantum computing secure authentication;
(ii) using a secure cryptographic hash function;
(iii) using a secure signature scheme for creating signatures; and
(iv) creating a binary tree to prove an authenticity of a signee.

14. The method according to claim 13, wherein the secure hash function is at least one of: SHA-3, AES-based hash.

15. The method according to claim 13, wherein the secure hash function is based on a symmetric cipher.

16. The method according to claim 13, wherein the secure signature scheme is a Lamport signature scheme.

17. The method according to claim 13, comprising generating twice as many pseudo random numbers as a number of messages.

18. The method according to claim 17, comprising:
(i) generating a list of the pseudo random numbers;
(ii) using half of the pseudo random numbers as secret keys and the other half as public keys for a Lamport signature scheme;
(iii) creating a Merkle tree computing the public keys; and
(iv) exporting a root node of the Merkle tree as a public key.

19. The method according to claim 17, comprising:
(i) generating a list of the pseudo random numbers;
(ii) using half of the pseudo random numbers as secret keys and the other half as public keys for a Lamport signature scheme;
(iii) creating a Merkle tree computing the public keys; and
(iv) exporting intermediate nodes of the Merkle tree as part of the public key.

20. The method according to claim 17, comprising:
(i) generating a list of the pseudo random numbers;
(ii) using half of the pseudo random numbers as secret keys and the other half as public keys for a Lamport signature scheme;
(iii) creating a Merkle tree computing the public keys; and
(iv) exporting a root node and at least one intermediate node of the Merkle tree as part of the public key.

21. The method according to claim 17, comprising:
(i) generating a first list of the pseudo random numbers;
(ii) using half of the pseudo random numbers as secret keys and the other half as public keys for a Lamport signature scheme;
(iii) creating a Merkle tree computing the public keys;
(iv) generating a second list of pseudo random numbers before the last secret key in the first list is used up;
(v) using half of the pseudo random numbers of the second list as secret keys and the other half as public keys for the Lamport signature scheme;
(vi) creating a Merkle tree computing the public keys from the second list;
(vii) exporting the public keys from the second list on a public key chain; and
(viii) signing the public key chain with a remaining secret key of the first list.

22. A computer program product for generating pseudo random numbers, the computer program product comprising a non-transitory computer readable storage medium having program instructions embodied therewith, the program instructions executable by a computer to cause the computer to perform a method, comprising:
  (i) calculating, by the computer, a first hash chain from an initial hash value (H_0), the first hash chain comprising a first sequence of hash values (HA_1, HA_2, . . . , HA_M), with index M being a positive integer;
  (ii) calculating, by the computer, a second hash chain (20) comprising a second sequence of hash values (HB_1, HB_2, . . . , HB_M) from the initial hash value (H_0) and the hash values (HA_1, HA_2, . . . , HA_M) of the first sequence wherein calculating the second hash chain comprises:
    a. calculating, by the computer, a first hash value (HB_1) of the second sequence from the initial hash value (H_0) and a last hash value (HA_M) of the first sequence, and
    b. calculating, by the computer, a subsequent hash value (HB_n+1) of the second sequence from a preceding hash value (HB_n) of the second sequence and a value (HA_1−1) of the first sequence preceding the hash value (HA_1) of the first sequence that has been used to calculate the preceding hash value (HB_n) of the second sequence, with index n, 1 being a positive integer from 1 to M; and
  (iii) determining, by the computer, the pseudo random numbers from the hash values (HB_1, HB_2, . . . , HB_M) of the second sequence; and
  (iv) using, by the computer, a cryptographic algorithm based on the pseudo random numbers for quantum computing secure authentication.

23. A data processing system comprising a processor and memory storing having stored therein instructions for execution of a data processing program executable by the processor for causing the processor to perform the steps comprising:
  (i) calculating a first hash chain from an initial hash value (H_0), the first hash chain comprising a first sequence of hash values (HA_1, HA_2, . . . , HA_M), with index M being a positive integer;
  (ii) calculating a second hash chain comprising a second sequence of hash values (HB_1, HB_2, . . . , HB_M) from the initial hash value (H_0) and the hash values (HA_1, HA_2, . . . , HA_M) of the first sequence, wherein calculating the second hash chain comprises:
    a. calculating a first hash value (HB_1) of the second sequence from the initial hash value (H_0) and a last hash value (HA_M) of the first sequence, and
    b. calculating a subsequent hash value (HB_n+1) of the second sequence from a preceding hash value (HB_n) of the second sequence and a value (HA_1−1) of the first sequence preceding the hash value (HA_1) of the first sequence that has been used to calculate the preceding hash value (HB_n) of the second sequence, with index n, 1 being a positive integer from 1 to M; and (iii) determining the pseudo random numbers from the hash values (HB_1, HB_2, ..., HB_M) of the second sequence; and (iv) using a cryptographic algorithm based on the pseudo random numbers for quantum computing secure authentication.

24. A computer program product for quantum computing secure authentication, the computer program product comprising a non-transitory computer readable storage medium having program instructions embodied therewith, the program instructions executable by a computer to cause the computer to perform a method, comprising:

(i) generating, by the computer, pseudo random numbers with a generator device configured to generate pseudo random numbers, the generator device comprising a processor and a memory storing instructions for:

a. calculating a first hash chain from an initial hash value (H_0), the first hash chain comprising a first sequence of M hash values (HA_1, HA_2, ..., HA_M), with index M being a positive integer;

b. calculating a second hash chain comprising a second sequence of M hash values (HB_1, HB_2, ..., HB_M) from the initial hash value (H_0) and the hash values (HA_1, HA_2, ..., HA_M) of the first sequence, wherein calculating the second hash chain comprises:

i. calculating a first hash value (HB_1) of the second sequence from the initial hash value (H_0) and a last hash value (HA_M) of the first sequence, and ii. calculating a subsequent hash value (HB_n+1) of the second sequence from a preceding hash value (HB_n) of the second sequence and a value (HA_1-1) of the first sequence preceding the hash value (HA_1) of the first sequence that has been used to calculate the preceding hash value (HB_n) of the second sequence, with index n, 1 being a positive integer from 1 to M; and c. determining the pseudo random numbers from the hash values (HB_1, HB_2, ..., HB_M) of the second sequence; and d. using a cryptographic algorithm based on the pseudo random numbers for quantum computing secure authentication;

(ii) using, by the computer, a secure cryptographic hash function;

(iii) using, by the computer, a secure signature scheme for creating signatures; and (iv) creating, by the computer, a binary tree to prove an authenticity of a signee.

* * * * *